United States Patent
Lee et al.

(10) Patent No.: US 11,195,019 B2
(45) Date of Patent: Dec. 7, 2021

(54) METHOD AND APPARATUS FOR PROVIDING INFORMATION BASED ON OBJECT RECOGNITION, AND MAPPING APPARATUS THEREFOR

(71) Applicant: LG ELECTRONICS INC., Seoul (KR)

(72) Inventors: Eun Sang Lee, Gyeonggi-do (KR); Hye Young Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/557,881

(22) Filed: Aug. 30, 2019

(65) Prior Publication Data

US 2019/0384978 A1  Dec. 19, 2019

(30) Foreign Application Priority Data

Aug. 6, 2019  (KR) .......................... 10-2019-0095643

(51) Int. Cl.
*G06T 19/00* (2011.01)
*G06K 9/00* (2006.01)
*G06K 9/22* (2006.01)

(52) U.S. Cl.
CPC ........... *G06K 9/00671* (2013.01); *G06K 9/22* (2013.01)

(58) Field of Classification Search
CPC .............. G06T 19/006; G06T 19/20; G06T 2207/30204; G06K 9/00671; G06K 9/22; G06K 9/6274
See application file for complete search history.

(56) References Cited

U.S. PATENT DOCUMENTS

| | | | |
|---|---|---|---|
| 9,792,594 B1* | 10/2017 | Bayha ................ | G06Q 20/1085 |
| 2007/0162942 A1* | 7/2007 | Hamynen .......... | H04N 21/6125 |
| | | | 725/105 |
| 2010/0023878 A1* | 1/2010 | Douris ................. | G06F 3/0481 |
| | | | 715/757 |
| 2013/0026220 A1* | 1/2013 | Whelihan ........... | G06F 16/9554 |
| | | | 235/375 |
| 2014/0146038 A1* | 5/2014 | Kangas .................. | G06T 19/20 |
| | | | 345/419 |
| 2015/0097864 A1* | 4/2015 | Alaniz ...................... | G06T 7/20 |
| | | | 345/633 |
| 2015/0130790 A1* | 5/2015 | Vasquez, II ........... | G06T 19/006 |
| | | | 345/419 |
| 2016/0189288 A1* | 6/2016 | Todeschini ......... | G06Q 30/0643 |
| | | | 705/27.2 |
| 2016/0203365 A1* | 7/2016 | Breedvelt-Schouten .................... | |
| | | | G06T 7/62 |
| | | | 345/633 |
| 2016/0217612 A1* | 7/2016 | Petill ........................ | G06T 3/40 |

(Continued)

FOREIGN PATENT DOCUMENTS

| KR | 101421704 | 7/2014 |
|---|---|---|
| KR | 101881529 | 7/2018 |

*Primary Examiner* — Phong X Nguyen
(74) *Attorney, Agent, or Firm* — Lee, Hong, Degerman, Kang & Waimey

(57) ABSTRACT

Disclosed is an information providing apparatus capable of communicating with other electronic devices and an external server in a 5G communication environment by executing a mounted artificial intelligence (AI) algorithm and/or machine learning algorithm. The apparatus includes a camera, a display, a processor, and the like. By providing the information providing apparatus, a user-friendly AR item based on the recognized object may be provided.

15 Claims, 12 Drawing Sheets

(56) References Cited

U.S. PATENT DOCUMENTS

| | | | |
|---|---|---|---|
| 2016/0371890 A1* | 12/2016 | Raichelgauz | G06F 3/048 |
| 2017/0124770 A1* | 5/2017 | Vats | G06T 19/003 |
| 2018/0046874 A1* | 2/2018 | Guo | G06K 9/3208 |
| 2018/0053352 A1* | 2/2018 | Finding | H04N 5/33 |
| 2019/0147653 A1* | 5/2019 | Henderson | G06K 9/00208 |
| | | | 345/633 |
| 2019/0371067 A1* | 12/2019 | Simari | G06T 7/75 |
| 2020/0097077 A1* | 3/2020 | Nguyen | G06F 3/04815 |
| 2020/0143600 A1* | 5/2020 | Dai | G06T 19/00 |
| 2020/0210967 A1* | 7/2020 | Price | G06K 9/00671 |

* cited by examiner

[FIG. 1]
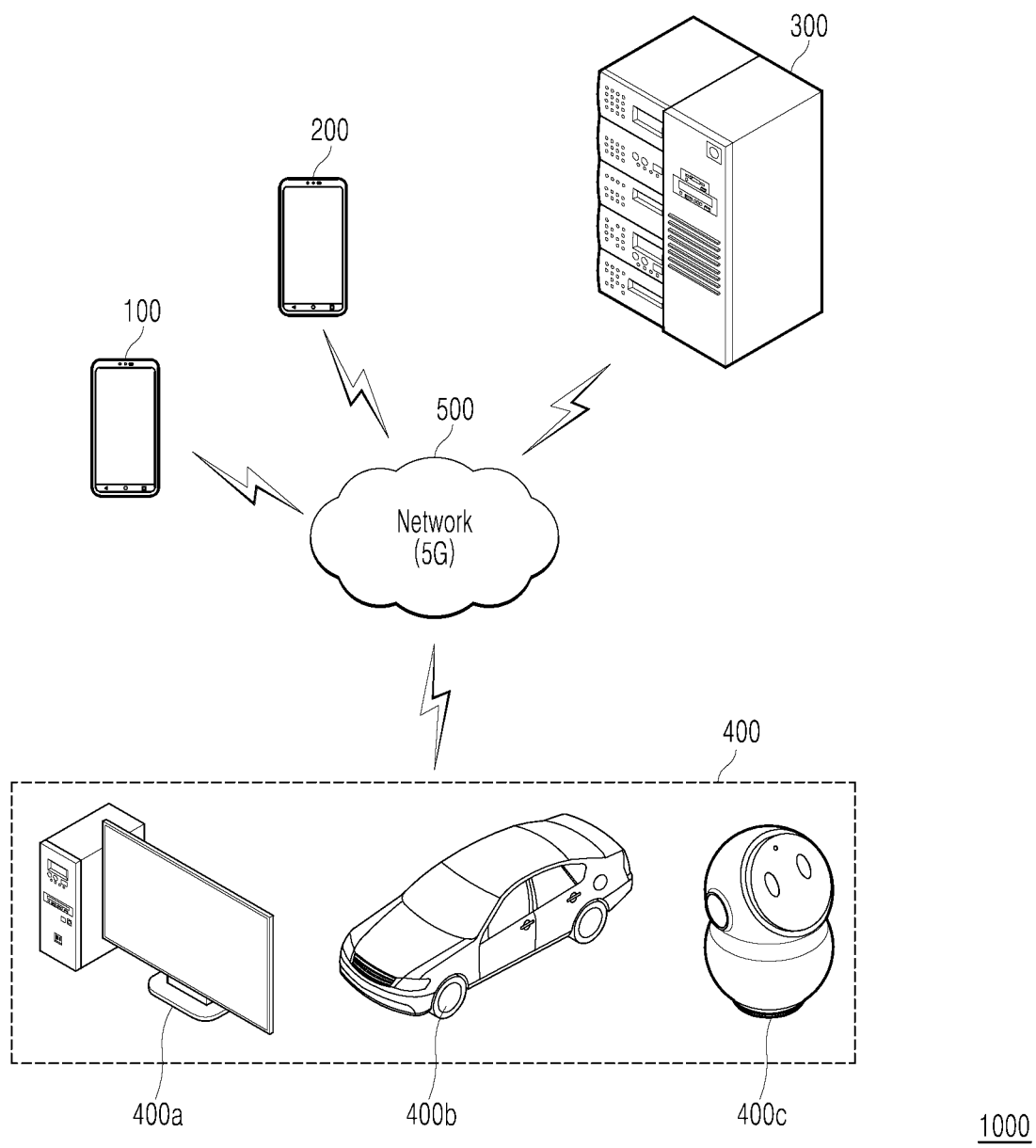

[FIG. 2]
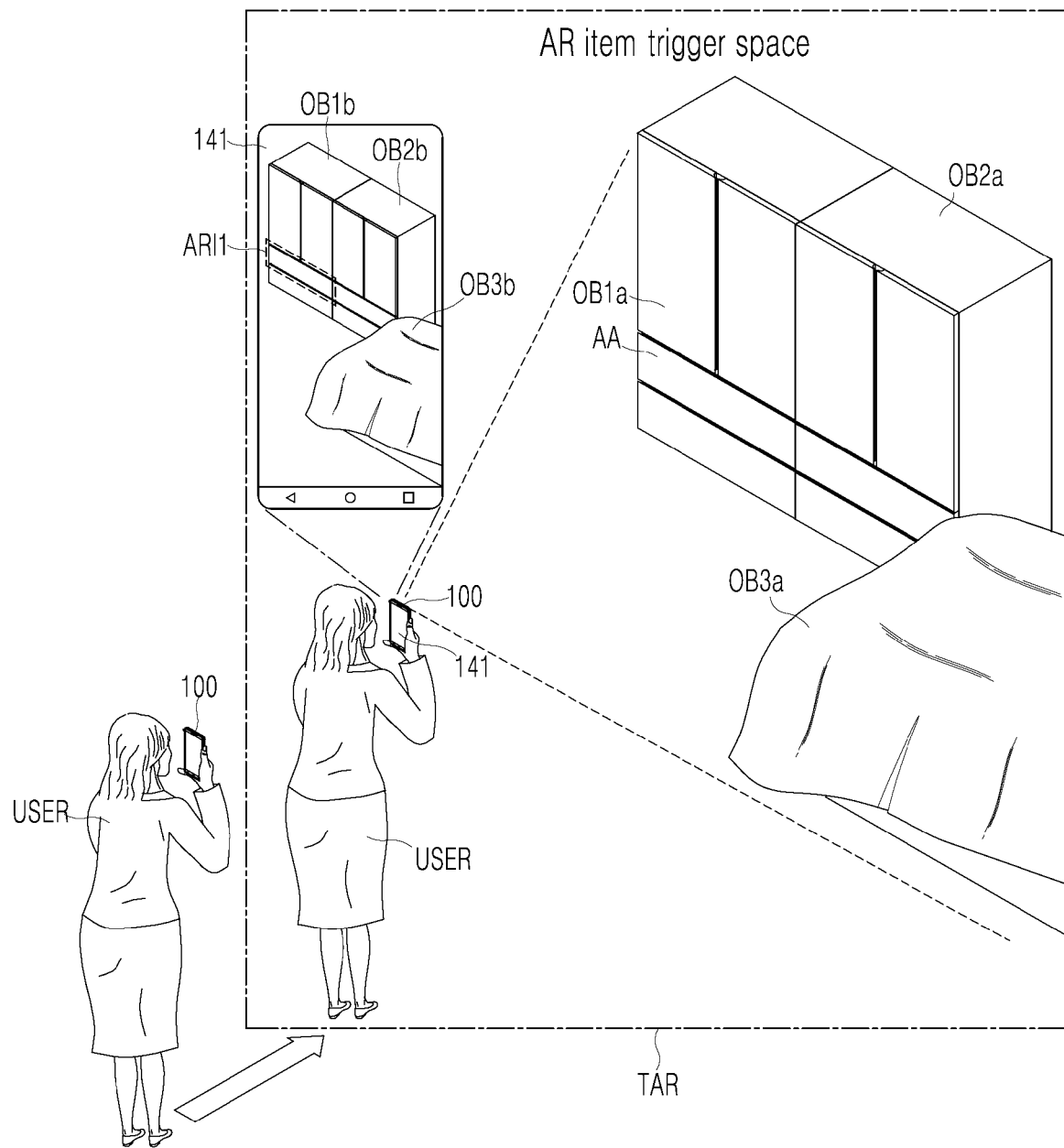

[FIG. 3]
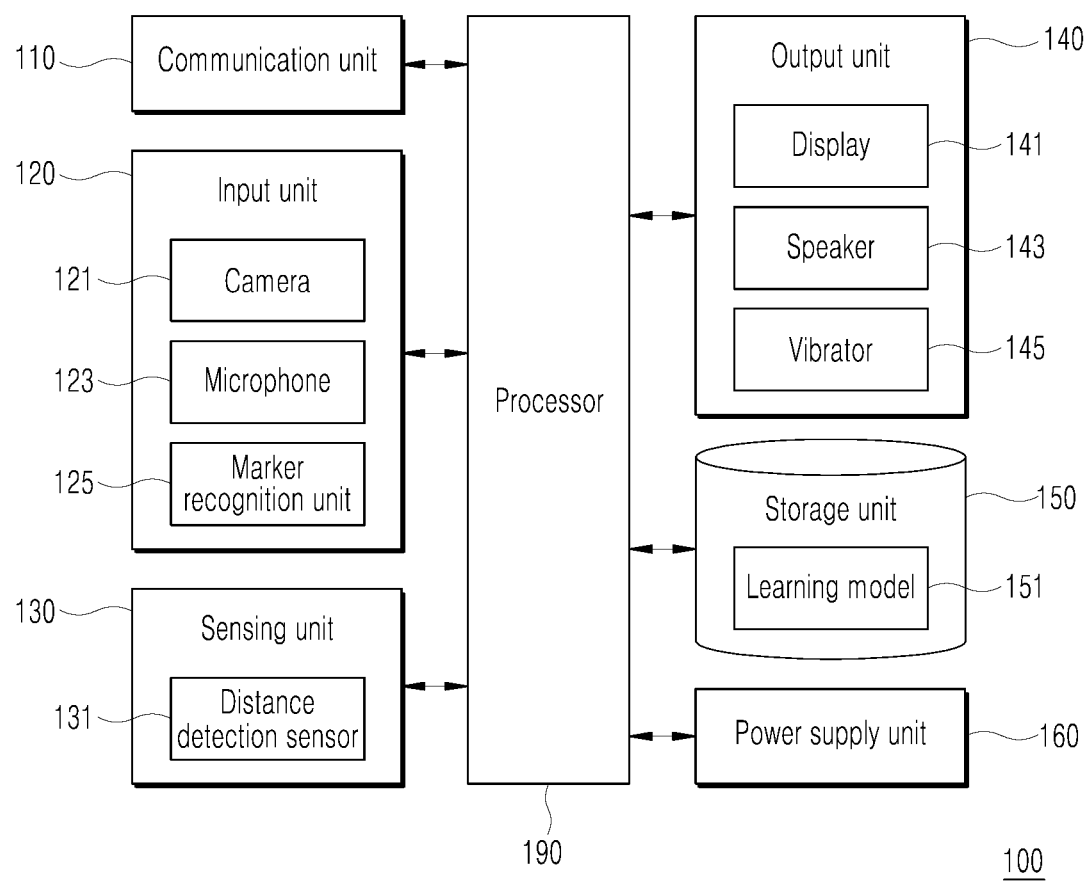

[FIG. 4]
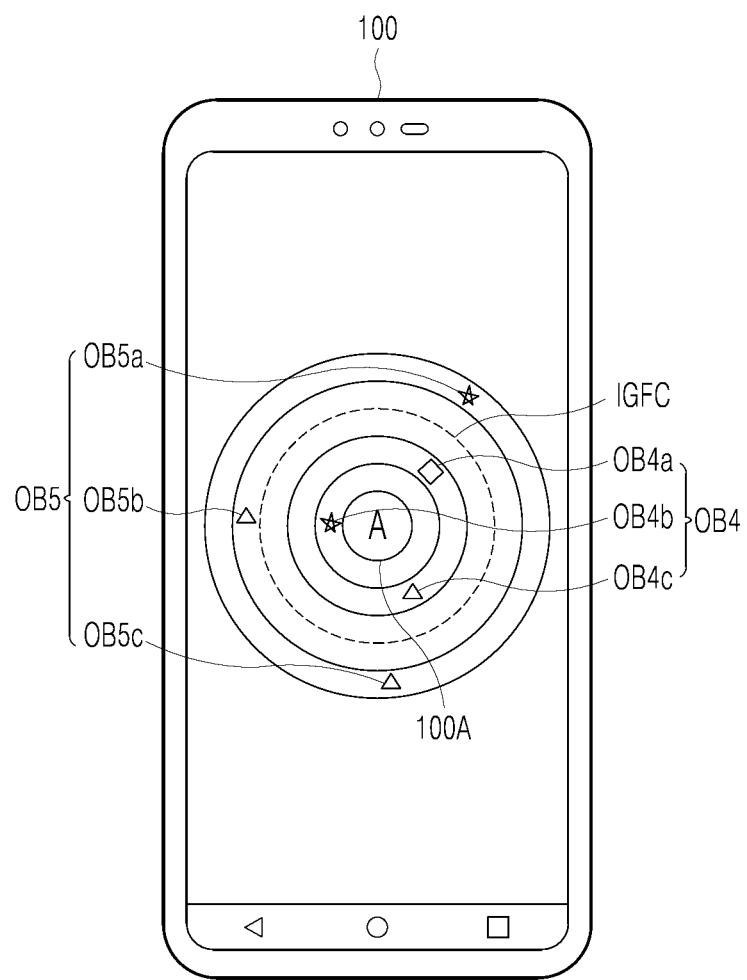

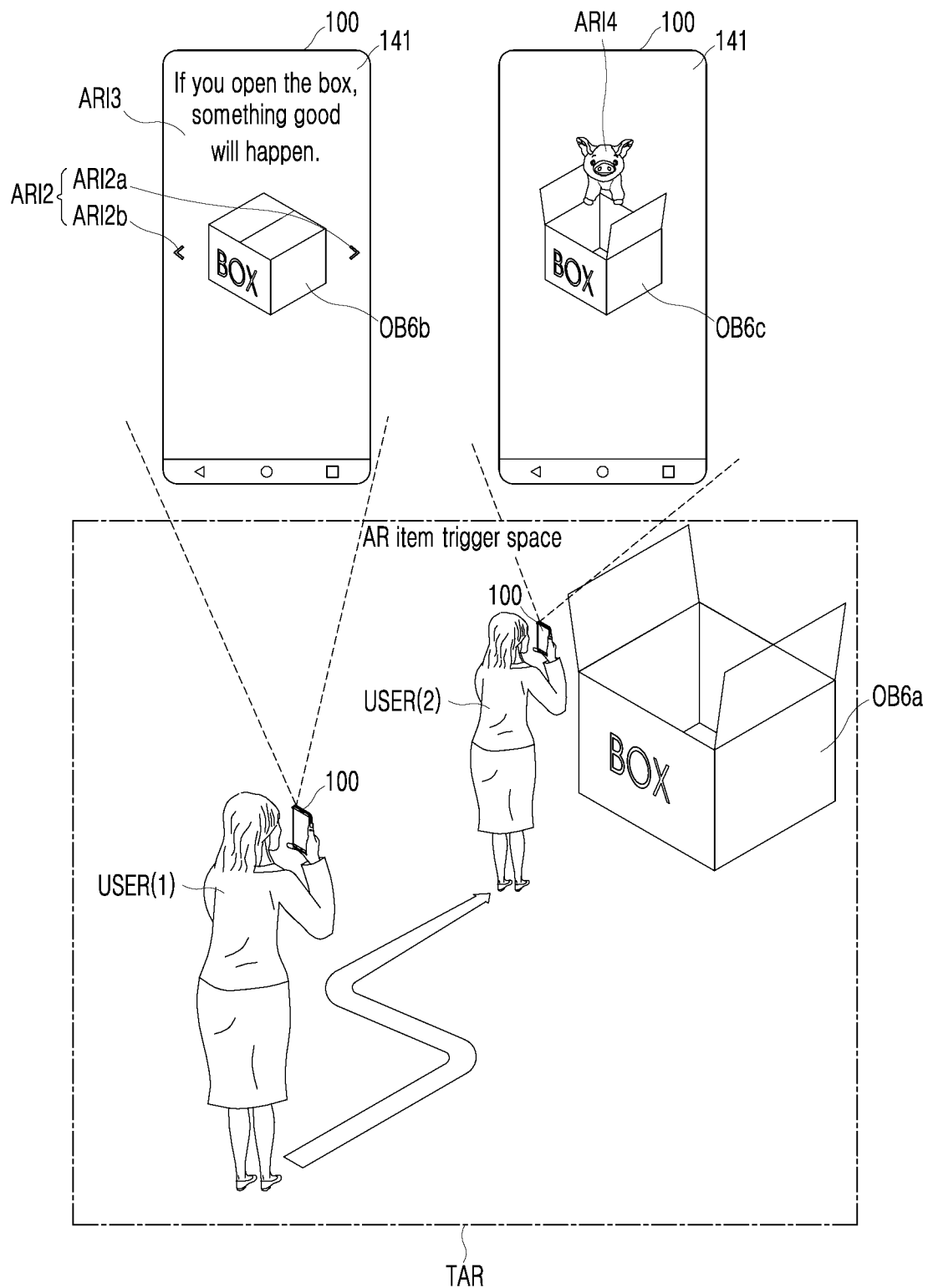
[FIG. 5]

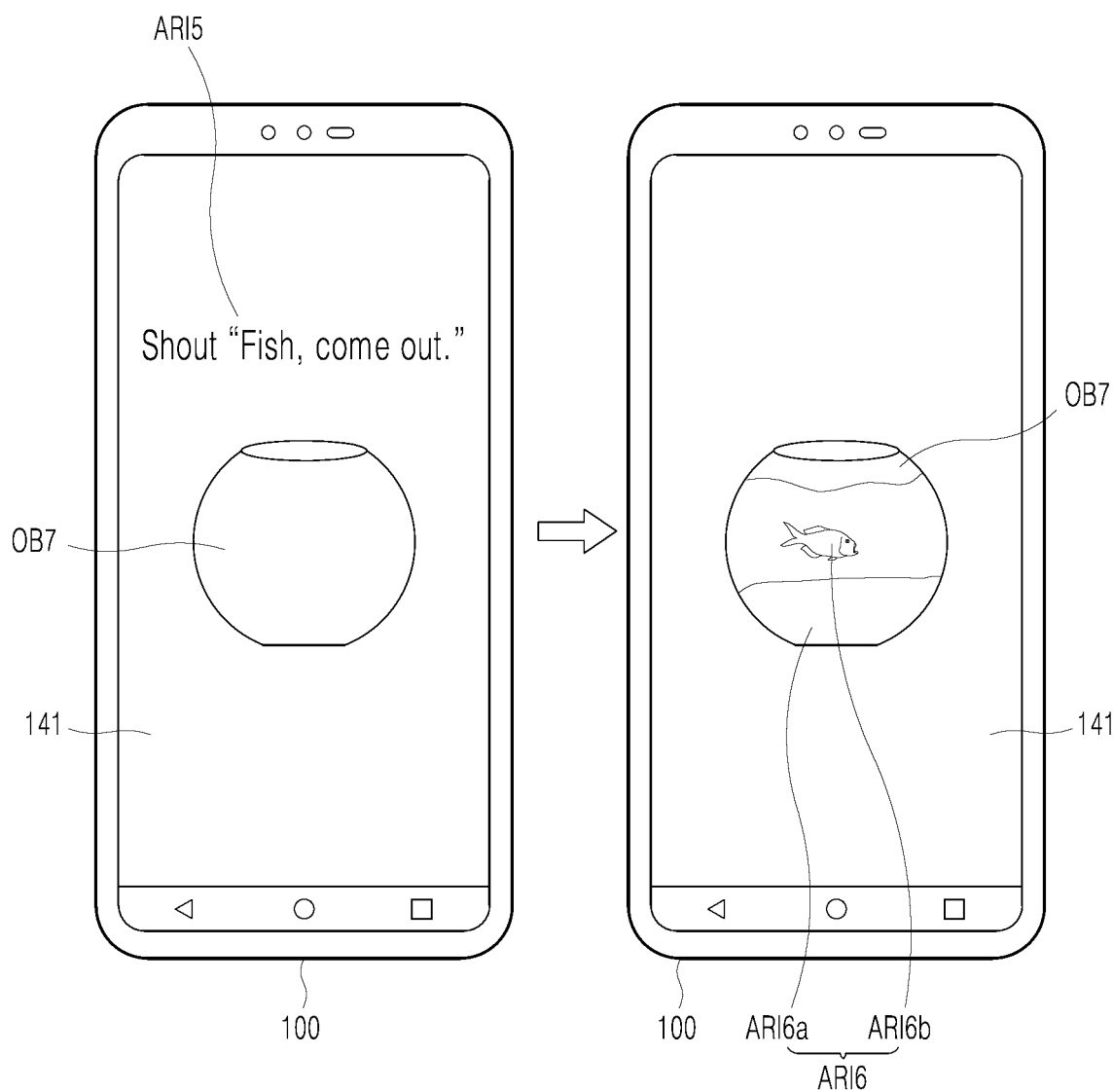
[FIG. 6]

[FIG. 7]
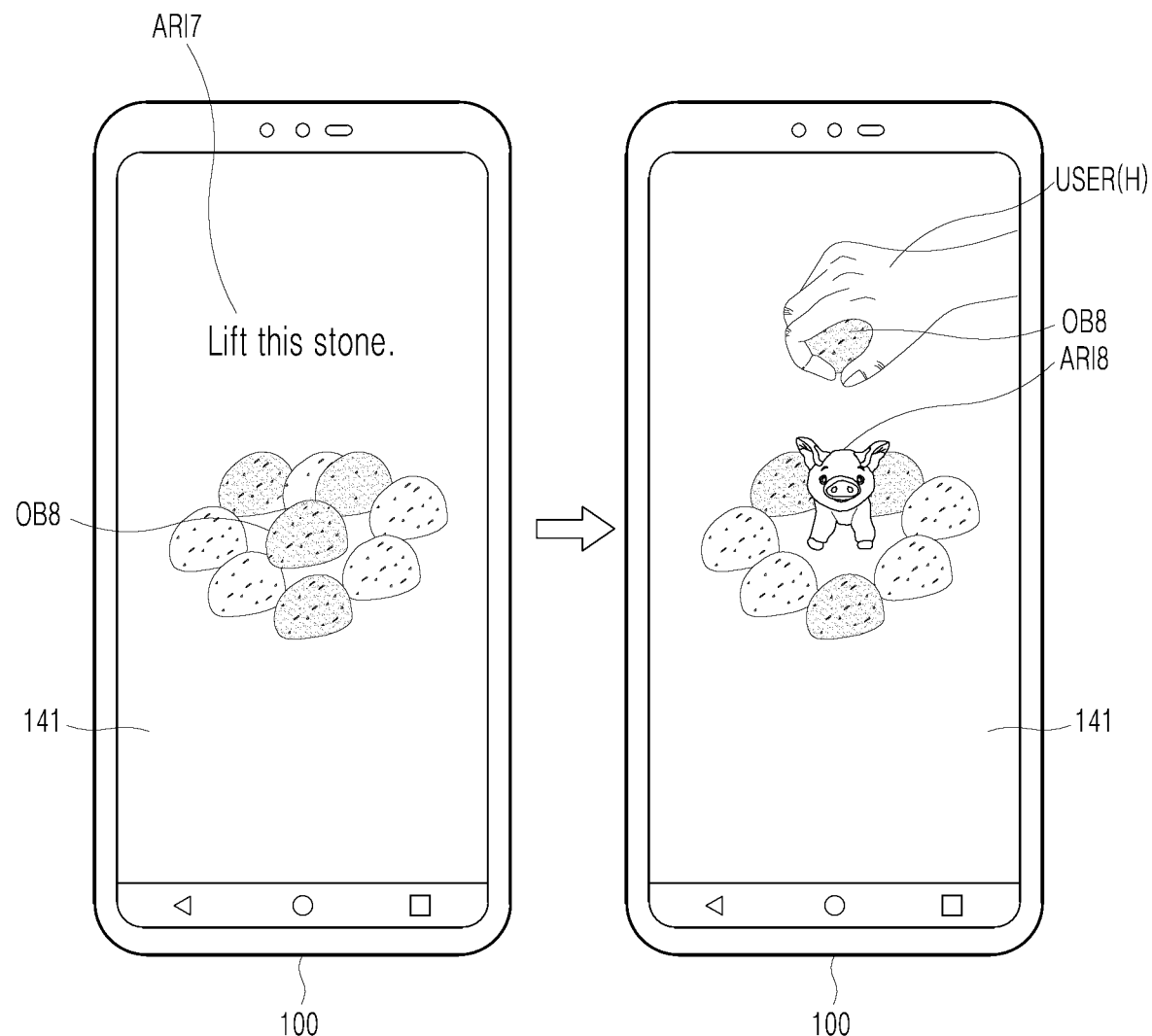

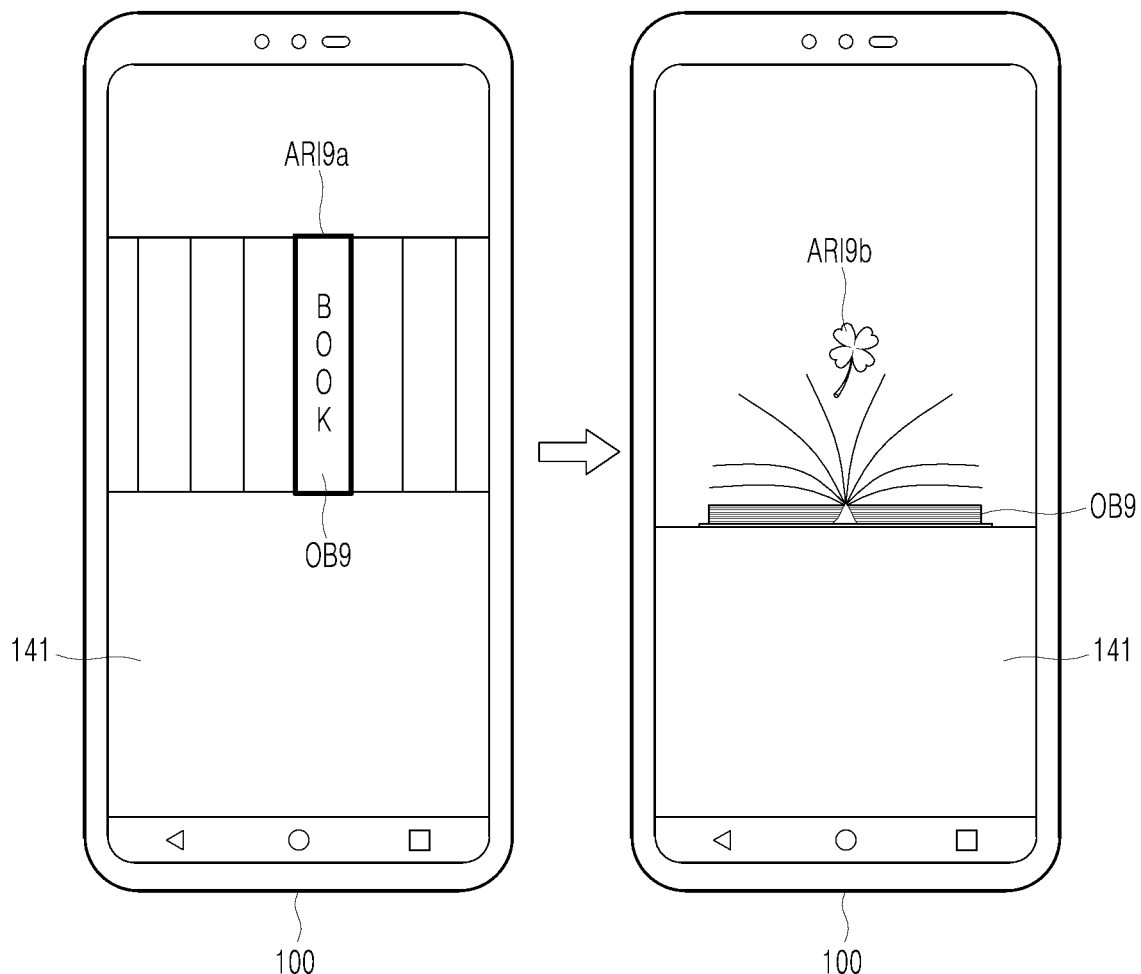
[FIG. 8]

[FIG. 9]
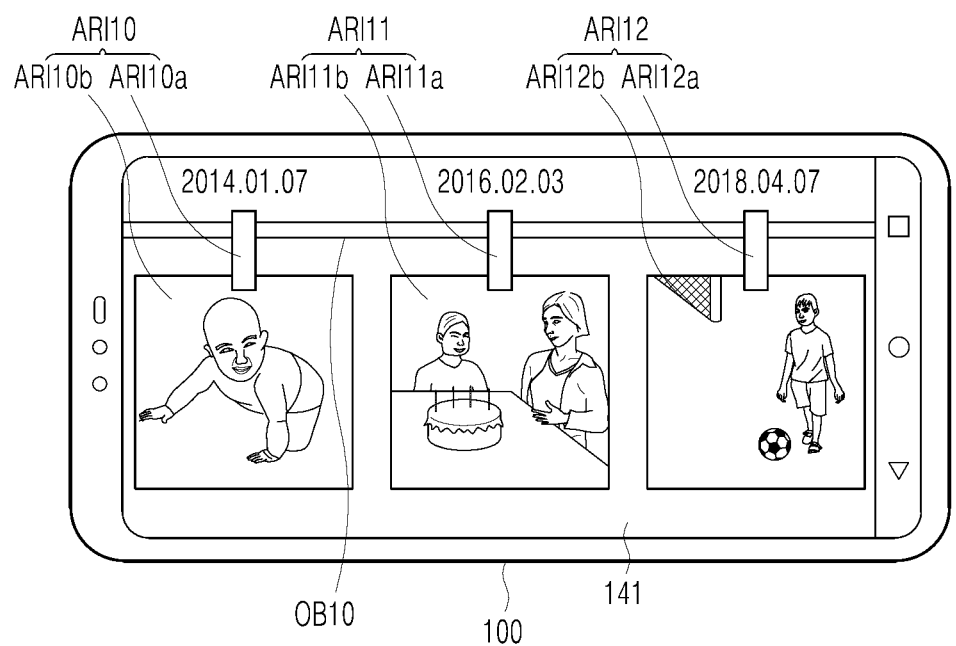

[FIG. 10]
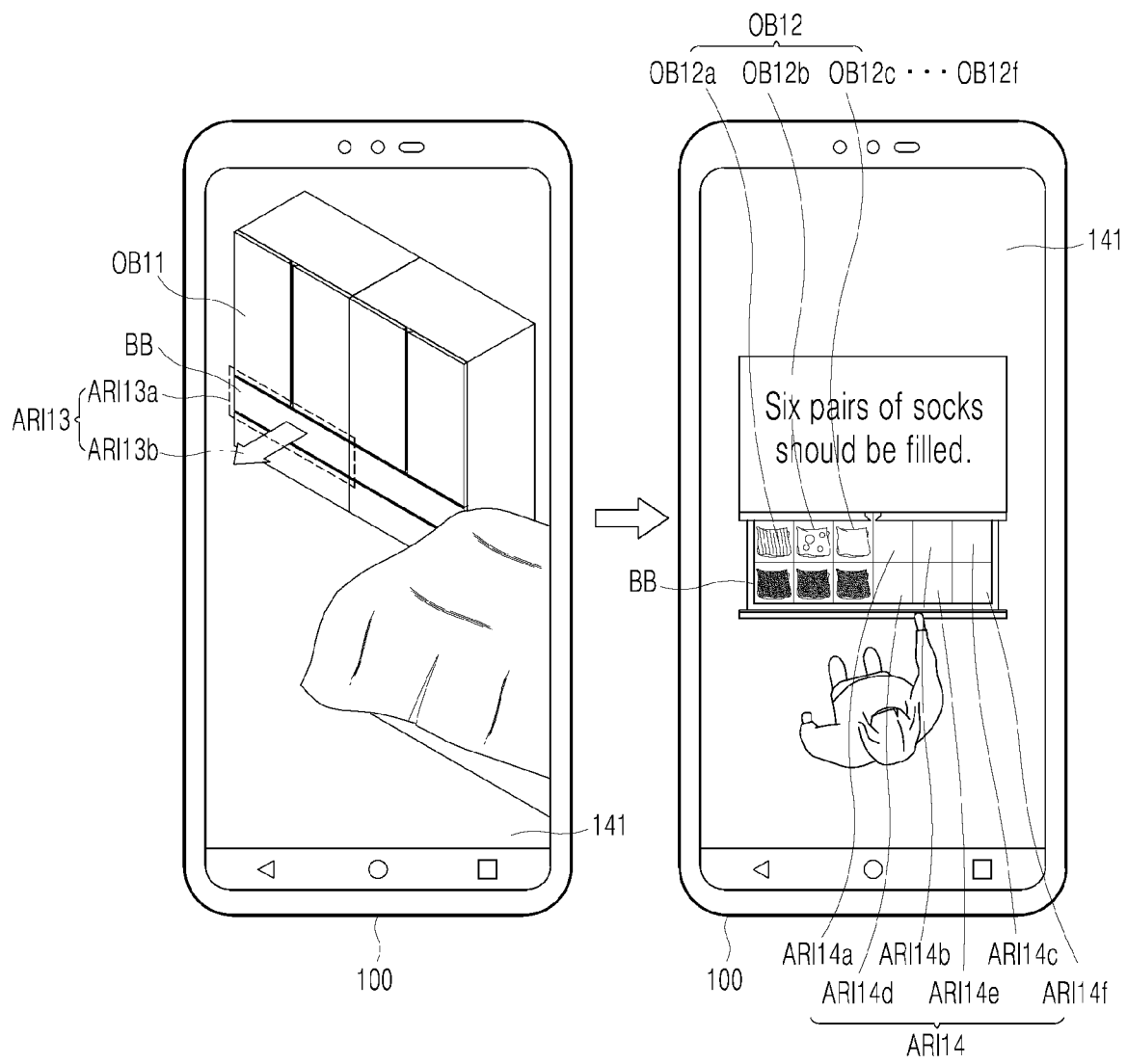

[FIG. 11]
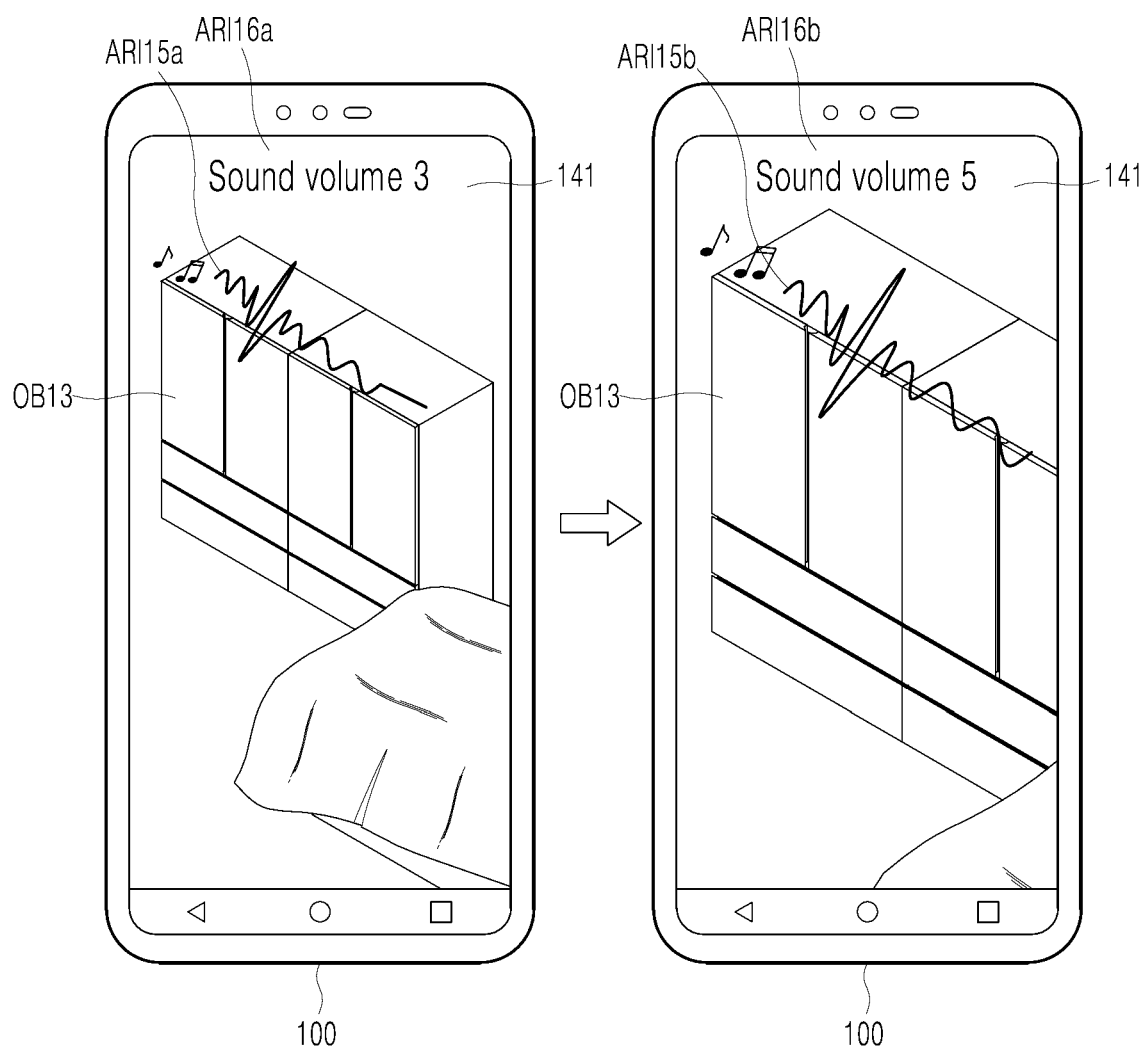

[FIG. 12]
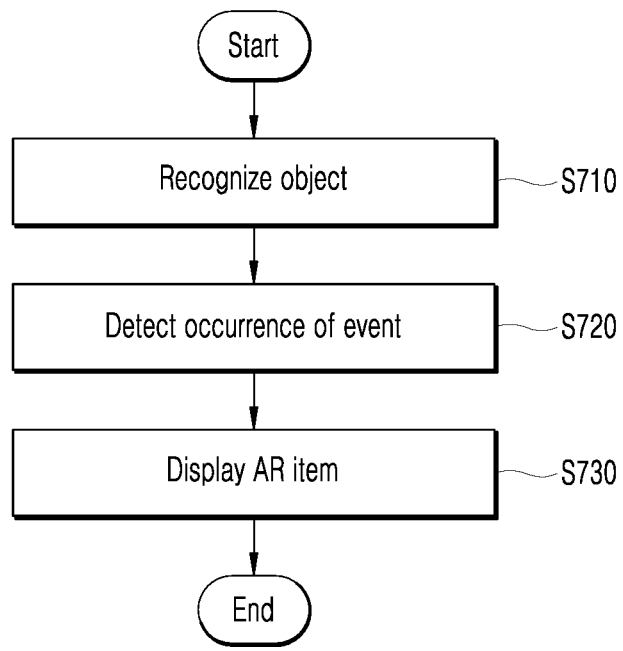

METHOD AND APPARATUS FOR PROVIDING INFORMATION BASED ON OBJECT RECOGNITION, AND MAPPING APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0095643, filed on Aug. 6, 2019, the contents of which are hereby incorporated by reference herein in its entirety.

BACKGROUND

1. Technical Field

The present disclosure relates to a method and an apparatus for providing information based on object recognition and a mapping apparatus therefor, and more particularly, to a method and an apparatus for recognizing an object and providing an augmented reality item associated with the recognized object and a mapping apparatus for an object and an augmented reality item.

2. Description of Related Art

Terminals may be classified into a mobile terminal and a fixed terminal depending on whether the terminal is movable. The mobile terminal may be further classified into a portable terminal and a stationary terminal according to whether to be directly portable by a user.

Functions of the mobile terminal have been diversified, and as the performance of a camera is developed, various functions using the camera are being developed. For example, development of functions of photographing high-quality still images or moving images or generating 3D images using depth information of images received through a camera is being actively performed.

In Korean Patent Registration No. 10-1881529 (registered on Jul. 18, 2018), there is disclosed a glass type mobile terminal capable of displaying information regarding an object selected from a photographing image by a user on a display.

However, in the case of the mobile terminal disclosed in Korean Patent Registration No. 10-1881529 (registered on Jul. 18, 2018), since a separate process is required to explicitly select an object by the user, there is a limitation in that information related to the object is not automatically displayed when the mobile terminal moves.

In Korean Patent Registration No. 10-1421704 (registered on Jul. 15, 2014), there is disclosed a mobile terminal capable of dividing an image into a plurality of segment areas and extracting texts included in each segment area.

However, in the case of the mobile terminal disclosed in Korean Patent Registration No. 10-1421704 (registered on Jul. 15, 2014), since only the text expressed in the image is extracted, there is a limitation in that information related to the object, which is not expressed in the image, may not be properly displayed.

SUMMARY OF THE INVENTION

An object of the present disclosure is to provide a method and an apparatus for providing information capable of recognizing an object in a photographing range and outputting an augmented reality-based item corresponding to the recognized object.

Another object of the present disclosure is to provide a method and an apparatus for providing information capable of outputting an augmented reality-based item and a user interface so as to match the properties of the recognized object.

Yet another object of the present disclosure is to provide a method and an apparatus for providing information based on an object capable of timely providing information related to surrounding objects automatically and in real-time.

Still yet another object of the present disclosure is to provide a method and an apparatus for providing information capable of appropriately outputting information that is easy to be missed by a user in the form of memos.

The technical objects of the present disclosure are not limited to the aforementioned technical objects, and other technical objects, which are not mentioned above, will be apparently appreciated by a person having ordinary skill in the art from the following description.

In order to achieve the objects, according to an exemplary embodiment of the present disclosure, an information providing apparatus based on object recognition may include an input unit including a camera, an output unit including a display, and a processor recognizing an object disposed in a photographing range of the camera.

The processor may output the AR item on the display based on an exposed area of the object exposed in the photographing range and a non-exposed area of the object not exposed in the photographing range when a predetermined event for outputting at least one augmented reality (AR) item corresponding to the recognized object has occurred.

The processor may display a first AR item in the exposed area of the object when the predetermined event has occurred.

The first AR item may include a phrase or an image for inducing a user's motion for exposing the non-exposed area of the object.

The processor may display, in a predetermined area, a second AR item including at least one of information about the first AR item, information about an article disposed in the non-exposed area, information about the AR item disposed in the non-exposed area, or information about the object.

The object may include a storage space and an opening/closing portion for opening and closing the storage space, and the processor may display a first AR item for inducing opening of the storage space when the predetermined event has occurred.

The processor may display a third AR item in the photographing range of the camera when the storage space is opened.

The object may include a storage space, and when the predetermined event has occurred, the processor may display a first AR item indicating water to be filled in the storage space by a predetermined amount and display a second AR item indicating a swimming body in the first AR item.

The processor may output the AR item including user's memo information on the display based on at least one of time information, moving route information, location information, and use frequency information based on a user's life pattern.

In some exemplary embodiments, the information providing apparatus may further include a communication unit having a short-range communication module and a mobile communication module, in which the processor may determine that the predetermined event has occurred when the processor enters short-range communication coverage of the object through the short-range communication module or enters within a predetermined range of the mobile communication coverage to which the object belongs through the mobile communication module.

The input unit may further include a microphone, and the processor may determine that the predetermined event has occurred when a predetermined sound sequence is input through the microphone.

The input unit may further include a marker recognition unit, and the processor may determine that the predetermined event has occurred when a marker adjacent the object by a predetermined distance is recognized by the marker recognition unit. The marker recognition unit comprises at least one of a recognizer.

The output unit may include a speaker or a vibrator, and the processor may output a predetermined sound through the speaker or output a predetermined pattern of vibration through the vibrator when the predetermined event has occurred, or the AR item is displayed on the display.

The output unit may further include a speaker and the processor may output a predetermined sound through the speaker when the information providing apparatus approaches the object within a predetermined distance and increase the output intensity of the sound as the distance from the object is closer.

According to an exemplary embodiment of the present disclosure, an information providing method based on object recognition may include recognizing an object disposed within a photographing range of a camera, detecting occurrence of a predetermined event for outputting one or more augmented reality items corresponding to the recognized object, and displaying the AR item based on an exposed area of the object exposed to the photographing range and a non-exposed area of the object not exposed to the photographing range when the predetermined event has occurred.

The detecting of the occurrence of the predetermined event may selectively include one of detecting entry of the object into short-range communication coverage, detecting entry of the object into mobile communication coverage in a predetermined range to which the object belongs, detecting an input of a predetermined sound sequence, and detecting a marker adjacent to the object by a predetermined distance.

The displaying of the AR item may include displaying a first AR item in the exposed area of the object when the predetermined event has occurred.

The displaying of the first AR item may include displaying a phrase or an image for inducing a user's motion for exposing the non-exposed area of the object.

The displaying of the first AR item may include displaying, in a predetermined area, a second AR item including at least one of information about the first AR item, information about an article disposed in the non-exposed area, information about the AR item disposed in the non-exposed area, or information about the object.

According to an exemplary embodiment of the present disclosure, a mapping apparatus for mapping at least one AR item activated under a predetermined condition to an object includes an input unit including a camera, a storage unit, and a processor, in which the processor recognizes an object disposed in a photographing range of the camera and stores, in the storage unit, at least one of information about the recognized object, arrangement information of the AR item, and information about the AR item, and may set event information activating the AR item based on an exposed area of the object exposed in the photographing range and a non-exposed area of the object not exposed in the photographing range.

The processor may dispose the AR item in a predetermined region of the object based on configuration information including at least one of planar or three-dimensional shape information, form information, presence/absence information of a storage space, or arrangement information of the recognized object.

The technical aspects of the present disclosure are not limited to the aforementioned technical aspects, and other technical aspects, which are not mentioned above, will be apparently appreciated by a person having ordinary skill in the art from the following description.

According to various exemplary embodiments of the present disclosure, the following effects may be derived.

First, the augmented reality-based item corresponding to the recognized object is output, thereby improving user convenience and improving user friendliness.

Second, an augmented reality-based item is output in accordance with the characteristics of the recognized object, and a use and manipulation method of the user interface is provided, thereby enhancing user convenience.

Third, information related to the surrounding objects may be timely provided automatically and in real-time, thereby more easily accessing information by a user than posting a memo or a message in a conventional fixed space and improving user convenience.

Fourth, information that is easy to be missed by a user may be appropriately output in a memo form, and various access processes for searching for the corresponding item may be provided, thereby improving device efficiency and enhancing user convenience.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a schematic diagram illustrating an information providing cloud system based on a 5G network according to an exemplary embodiment of the present disclosure;

FIG. 2 is a diagram for describing driving of an information providing apparatus for outputting an augmented reality item according to an exemplary embodiment of the present disclosure;

FIG. 3 is a block diagram illustrating a configuration of an information providing apparatus according to an exemplary embodiment of the present disclosure;

FIG. 4 is a diagram for describing driving of an information providing apparatus for displaying a location of an object to which an AR item is mapped based on a geofence according to an exemplary embodiment of the present disclosure;

FIG. 5 is a diagram for describing driving of an information providing apparatus including a storage space and recognizing an object to which an AR item is mapped according to an exemplary embodiment of the present disclosure;

FIGS. 6 to 8 are diagrams illustrating driving of an information providing apparatus according to various exemplary embodiments of the present disclosure;

FIG. 9 is a diagram for describing driving of an information providing apparatus for displaying an AR item automatically when being close to an object at a predetermined distance according to an exemplary embodiment of the present disclosure;

FIGS. 10 to 11 are diagrams illustrating driving of an information providing apparatus according to various exemplary embodiments of the present disclosure; and FIG. 12 is a sequence diagram illustrating a driving method of an information providing apparatus according to an exemplary embodiment of the present disclosure.

DETAILED DESCRIPTION

Since techniques of artificial intelligence and extended reality may be applied to various exemplary embodiments of the present disclosure, the artificial intelligence and the extended reality will be described schematically.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In the ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

The supervised learning may refer to a method for training an artificial neural network with training data that has been given a label. In addition, the label may refer to a target answer (or a result value) to be guessed by the artificial neural network when the training data is inputted to the artificial neural network. The unsupervised learning may refer to a method for training an artificial neural network using training data that has not been given a label. The reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Next, extended reality (XR) collectively refers to virtual reality (VR), augmented reality (AR), and mixed reality (MR). VR technology provides objects or backgrounds in the real world only in CG images, AR technology provides virtual CG images together on real objects images, and MR technology is a computer graphic technology for providing virtual objects mixed and combined in the real world.

MR technology is similar to AR technology in that both real and virtual objects are shown together. However, there is a difference in that in AR technology, the virtual object is used as a complementary form to the real object, whereas in the MR technology, the virtual object and the real object are used in the same nature.

XR technology may be applied to a head-mount display (HMD), a head-up display (HUD), a mobile phone, a tablet PC, a laptop computer, a desktop computer, a TV, a digital signage, etc., which may refer to an XR device.

An augmented reality (AR) item disclosed in the present disclosure is an augmented reality-based item, may include an item provided with a CG image virtually created on the real object image, and may include an item that is difficult to distinguish between the real object image and the CG image, and furthermore indistinguishable, as the image editing is performed.

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Further, in describing the exemplary embodiment of this specification, a detailed description of related known technologies will be omitted if it is determined that the detailed description makes the gist of the exemplary embodiment disclosed in this specification unclear.

FIG. 1 is a schematic diagram illustrating an information providing cloud system 1000 based on a 5G network according to an exemplary embodiment of the present disclosure.

The information providing cloud system 1000 based on a 5G network may define various services that may be provided based on the 5G, and may include an information providing apparatus 100 based on object recognition, a mapping apparatus 200 for an AR item activated under a predetermined condition to an object, an information providing system 300, various devices 400, and a 5G network 500.

First, the information providing apparatus 100 based on object recognition (hereinafter referred to as an "information providing apparatus") may recognize various objects using a camera 121 (see FIG. 3), and provide information related to the recognized object to the user, the information providing system 300, the various devices 400, and the like.

The information providing apparatus 100 may include mobile devices such as a mobile phone, a smart phone, a laptop computer, a digital broadcasting terminal, a personal digital assistant (PDA), a portable multimedia player (PMP), navigation, a slate PC, a tablet PC, an ultrabook, and wearable devices, for example, a smartwatch, a smart glass, and a head mounted display (HMD). According to the exemplary embodiment, the information providing apparatus 100 may also include a fixed device such as a digital TV, a desktop computer, a digital signage, and the like, which are fixedly implemented. The information providing apparatus 100 in the present specification may be most efficient when implemented as a glass-type terminal, an HMD, or a watch-type terminal attached to a user's body.

Next, the apparatus 200 (hereinafter, referred to as a "mapping apparatus") that maps an AR-based item (hereinafter referred to as an "AR item") activated under a predetermined condition to an object may map the photographed object and the AR item to each other, and properly dispose the AR item.

In detail, the mapping apparatus 200 may dispose the AR item in a predetermined area or an adjacent area of the object based on configuration information of the object (for example, shape information, form information, information on whether or not the storage space is included, arrangement information, and the like). The disposed point may be an exposed area or a non-exposed area of the photographed object, and the AR item may or may not be exposed according to a photographing composition. The mapped AR item may be activated in the information providing apparatus 100 under a predetermined condition when the information providing apparatus 100 recognizes the object. The mapping apparatus 200 may arrange the AR item in a deep space as well as the surface of the object. When leaving a GPS-based marker, the mapping apparatus 200 may segment and divide the image into layers.

The information providing apparatus 100 may collect information about AR items mapped by the mapping apparatus 200 and objects from the information providing system 300 through a sharing application (app).

In an optional or additional embodiment, the mapping apparatus 200 may provide only image information, and the information providing system 300 may map an object and an AR item to each other.

The information providing system 300 may transmit various pieces of information to a corresponding apparatus according to a request of the information providing apparatus 100 or the mapping apparatus 200. The information providing system 300 may include a plurality of servers and may be implemented as a cloud type system.

The various devices 400 may include a computer 400*a*, a home appliance including a refrigerator, a washing machine, an air conditioner, an AI speaker, an autonomous vehicle 400*b*, a robot 400*c*, and the like, and transmit/receive various pieces of information via a 5G network 500.

The various devices 400 may be wirelessly connected to the information providing apparatus 100, the mapping apparatus 200, and the like via the 5G network 500 (e.g., Internet). According to an exemplary embodiment, the various devices 400 may include a mobile phone, a smart phone, a laptop computer, and the like described above.

The information providing apparatus 100 may communicate with the information providing system 300, the various devices 400, and the like through the network 500 using a communication module. The information providing apparatus 100 may request various pieces of information to the information providing system 300 and may receive various pieces of information operated/searched from the information providing system 300. The operation/search may include an operation or search related to artificial intelligence.

The information providing apparatus 100, the mapping apparatus 200, the information providing system 300, and the various devices 400 may all be equipped with 5G modules to transmit and receive data at a speed of 100 Mbps to 20 Gbps (or higher), thereby transmitting a large amount of video files to the various devices and may be driven at low power, thereby minimizing power consumption. However, the transmission rate may be implemented differently according to an exemplary embodiment.

The 5G network 500 may provide a communication environment of devices wiredly or wirelessly, including a 5G mobile communication network, a local area network, the Internet, and the like.

Hereinafter, the driving of the information providing apparatus 100 according to an exemplary embodiment will be described schematically with reference to FIG. 2.

A user USER may carry the information providing apparatus 100, and the information providing apparatus 100 may enter an AR item trigger space (TAR, hereinafter referred to as a "trigger space").

The information providing apparatus 100 may recognize first to third objects OB1*a* to OB3*a* that are actually arranged in the trigger space TAR through a camera 121 (see FIG. 3) based on vision recognition. The information providing apparatus 100 may display photographed first to third objects OB1*b* to OB3*b* corresponding to the first to third objects OB1*a* to Ob3*a* on the display 141.

The information providing apparatus 100 may recognize visual objects in an image within a photographing range, and the camera 121 may have a depth recognition function if necessary. In a selective exemplary embodiment, when the objects are implemented as a 3D image, a sensor and a camera having a plurality of depth recognition functions may be mounted.

The information providing apparatus 100 that enters the trigger space TAR may display, on the display 141, an AR item ARI1 mapped to a specific area AA of the first object OB1*a*. Various visual effects may be applied to the AR item ARI1, and in an optional or additional exemplary embodiment, the AR item ARI1 may be implemented not only as a still image but also as a moving image.

The information providing apparatus 100 may drive an application based on the camera 121, and the application may receive presence information of the AR item from the information providing system 300 in real-time and display the presence information on the display 141. In an optional exemplary embodiment, the information providing apparatus 100 may display AR item information corresponding to the object even through an AI-related learning model 151 stored in a storage unit 150 (see FIG. 3). In this case, the information providing apparatus 100 may determine whether to display AR items corresponding to an exposed area of an object exposed to the photographing range and a non-exposed area of an object not exposed to the photographing range based on the learning model 151.

Hereinafter, a configuration of the information providing apparatus 100 will be described with reference to FIG. 3.

Referring to FIG. 3, the information providing apparatus 100 may include a communication unit 110, an input unit 120, a sensing unit 130, an output unit 140, a storage unit 150, a power supply unit 160, and a processor 190. However, components illustrated in FIG. 3 are not essential to implementing the information providing apparatus 100 and the information providing apparatus 100 described in this specification may thus have components more or less than the components listed above.

First, the communication unit 110 may transmit/receive data with various communication entities illustrated in FIG. 1 using wired or wireless communication technologies. Communication unit comprising at least one of a communicator. For example, the communication unit 110 may transmit and receive sensor information, user input information, learning model information, control signal information, and the like, from and to the information providing system 300, the various devices 400, and the like, but the transmission information is not limited thereto.

In this case, the communication unit 110 may include a mobile communication module and a short-range communication module. The mobile communication module communicates through technologies such as global system for mobile communication (GSM), code division multi access (CDMA), long term evolution (LTE), 5G, etc. The short-range communication module may communicate through technologies such as a wireless LAN (WLAN), wireless fidelity (Wi-Fi), Bluetooth™, radio frequency identification (RFID), infrared data association (IrDA), ZigBee, near field communication (NFC), etc.

The input unit 120 may include a camera 121 for inputting an image signal, a microphone 123 for receiving an audio signal, a marker recognition unit 125 for recognizing various markers, and a user input unit for receiving information from the user. Here, a signal obtained from the camera 121 or the microphone 123 may be referred to as sensing data or sensor information by treating the camera 121 or the microphone 123 as a sensor.

The input unit 120 may obtain input data to be used when acquiring an output using the learning data and the learning model for model learning. The input unit 120 may obtain unprocessed input data, and in this case, the processor 190 may extract input features as preprocessing on the input data.

The sensing unit 130 may obtain at least one of internal information of the information providing apparatus 100, surrounding environment information of the information providing apparatus 100, or user information using various sensors.

At this time, the sensor included in the sensing unit 130 includes a distance detection sensor 131, a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, a lidar, a radar, and the like. Here, the distance detection sensor 131 may measure a distance between the object and the information providing apparatus 100. Accordingly, the information providing apparatus 100 may recognize an approach distance from the object while approaching the object.

The output unit 140 may generate an output related to visual, auditory, or tactile sense, and the output unit 140 may include a display 141 for outputting visual information, a speaker 143 for outputting auditory information, and a haptic module (e.g., a vibrator 145) for outputting tactile information.

The storage unit 150 stores data supporting various functions of the information providing apparatus 100. The storage unit 150 comprises at least one of a storage. The storage unit 150 may store a plurality of application programs or applications that are driven by the information providing apparatus 100, data for operating the information providing apparatus 100, and commands.

The storage unit 150 may store information required for performing an operation using artificial intelligence, machine learning, and an artificial neural network. The storage unit 150 may store the learning model 151 described above. The learning model 151 may be used to infer a result value with respect to new input data rather than learning data, and the inferred value may be used as a basis for a determination on which operation will be performed.

Here, the learning model 151 may include an object recognition model for accurately recognizing an object, an item extraction model for extracting an AR item corresponding to the recognized object, and an AR item arrangement model for where the extracted AR item is disposed in relation to the object.

The learning model 151 may determine whether to display the AR items corresponding to the exposed area and the non-exposed area of the photographed object according to the control of the processor 190.

The power supply unit 160 receives external power and internal power under the control of the processor 190 to supply power to the each component of the information providing apparatus 100. The power supply unit 160 includes a battery, and the battery may be a built-in battery or a replaceable battery. The battery may be charged by a wired or wireless charging scheme, in which the wireless charging scheme may include a self-induction scheme or a magnetic resonance scheme.

The processor 190 is a module that controls the components of the information providing apparatus 100. The processor 190 may refer to a data processing device built in a hardware, which includes physically structured circuits in order to perform functions represented as a code or command contained in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

The processor 190 may separately include a learning processor for performing an artificial intelligence operation or may include a learning processor by itself. The processor 190 may allow a model composed of an artificial neural network to be learned using learning data. Here, the learned artificial neural network may be referred to as a learning model. The learning model may be used to infer a result value with respect to new input data rather than learning data, and the inferred value may be used as a basis for a determination on which operation will be performed.

In this case, the processor 190 may be implemented to perform artificial intelligence processing together with a learning processor of an artificial intelligence system (e.g., the information providing system 300).

The processor 190 may recognize an object disposed within the photographing range of the camera 121 based on vision recognition. As described above, the object may include a storage space, an opening and closing portion exposing the storage space, and an organism as well as an article.

The processor 190 may wait for a predetermined event for outputting an AR item corresponding to the recognized object. The predetermined event may be an event generated by the information providing apparatus 100 and may correspond to a specific situation. Hereinafter, the occurrence of the predetermined event will be described.

The processor 190 may determine that a predetermined event has occurred when the information providing apparatus 100 enters short-range communication coverage of the object. For example, when the information providing apparatus 100 enters coverage of Wi-Fi communication, Bluetooth communication, NFC, UWB communication, etc., which covers the event generation area, the processor 190 may determine that a predetermined event has occurred.

In this case, when the object itself is an electronic device (smart device) including a communication module, a processor, or the like, the object may notify the entry of the information providing apparatus 100 to short range communication coverage directly to the information providing apparatus 100 or indirectly through the information providing system 300.

In addition, the processor 190 may drive an app based on the camera 121 and display on the display 141 an AR item automatically mapped to an object and an AR phrase providing information to a user based on distance information of various objects in the app.

In an optional or additional exemplary embodiment, the processor 190 may display information about an AR item mapped to an object in various ways or receive externally and display the information.

The processor 190 may determine that a predetermined event has occurred when the information providing apparatus 100 enters a predetermined range of mobile communication coverage to which the object belongs.

For example, when the information providing apparatus 100 enters the communication coverage of a specific cell based on a 5G millimeter wave, which covers the event occurrence area, the processor 190 may determine that a predetermined event has occurred.

In addition, when a predetermined sound sequence is input through the microphone 123, the processor 190 may determine that a predetermined event has occurred.

Here, the predetermined sound sequence may include a sound for knocking a corresponding object, a user's speech sound, and the like, and may include a background noise, a sound of an inaudible frequency, and, if the predetermined sound sequence is stored in advance, various sounds may be set as sounds for determining occurrence of a predetermined event. The processor 190 may analyze and determine an input of the sound sequence through the learning model 151.

In addition, the predetermined sound sequence may be used in combination with other situations to determine that a predetermined event has occurred. For example, the processor 190 may determine that a predetermined event has occurred when the sound sequence is input through the microphone 123 while being close to the object at a predetermined distance.

In addition, the processor 190 may determine that a predetermined event has occurred when a marker adjacent to the object at a predetermined distance is recognized by the marker recognition unit 125. The marker may include an optical identification (OID) marker, a QR marker, or the like, and a specific pattern may be set as a marker. For example, a book title, a cover image, and the like of a recognized book may be set as a marker, and various markers may be defined.

When a predetermined event has occurred, the processor 190 may display the AR item on the display 141 based on the exposed area of the object exposed to the photographing range and the non-exposed area of the object not exposed to the photographing range.

That is, even if the AR item is mapped to the object, the processor 190 may display only the AR item mapped to the exposed area displayed in the photographing range and may not display the AR item mapped to the non-exposed area not displayed in the photographing range.

The processor 190 may provide photographing composition information, information about an object, and one or more AR information mapped to the object to the learning model 151 as input data, and output as output data information about how much the object is exposed according to a photographing angle, information about whether to display the AR item according to an exposed area, information about how much the AR item is displayed, and the like.

Furthermore, the object and the AR item mapped thereto are mapped by the mapping apparatus 200, and the mapping apparatus 200 recognizes the object disposed within the photographing range of the camera, and may store at least one of the information about the recognized object, the arrangement information of the AR item, or the information about the AR item in a storage unit of the mapping apparatus 200. In addition, the mapping apparatus 200 may set event information for activating the AR item. In detail, the processor of the mapping apparatus 200 may set event information for activating the AR item based on the exposed area of the object exposed to the photographing range and the non-exposed area of the object not exposed to the photographing range.

The mapping apparatus 200 may arrange an AR item in a predetermined region of the object based on configuration information including at least one of shape information, form information, information on whether or not the storage space is included, or arrangement information of the recognized object. Since most of the configuration of the mapping apparatus 200 is the same as those of the information providing apparatus 100, a detailed description thereof will be omitted. Here, the shape information may include information representing shapes of two and three dimensions, and the form information may include information representing forms arranged on a predetermined surface, a curved surface, or the like.

The information providing apparatus 100 and the mapping apparatus 200 may share information about an object, information about an AR item, and information about arrangement through a sharing program (e.g., an app).

When the above-described predetermined event has occurred, the processor 190 of the information providing apparatus 100 may display a first AR item in the exposed area of the object. The first AR item may include a phrase or an image for inducing a user's motion to expose the non-exposed area of the object. For example, if the object is a stone and an AR item is disposed below the stone, the processor 190 may include a phrase or an image for moving the stone in the first AR item.

The processor 190 may display in a predetermined area a second AR item including at least one of information about the first AR item, article information disposed in the non-exposed area of the object, information about the AR item disposed in the non-exposed area of the object, or information about the object. The second AR item may be disposed in a peripheral area of the first AR item, but the exemplary embodiment is not limited thereto.

In addition, the processor 190 may display the AR item on the display 141 based on the configuration information of the object. The configuration information of the object may include information on the appearance (shape, form) of the object, the arrangement of the object, location information, and information on the presence or absence of a storage space of the object.

In addition, the processor 190 may dispose an AR item in a covered storage space, and dispose an AR item in an area between bookshelves when the covered book is unfolded, and dispose an AR item in a drawer compartment, and dispose an AR item at a gap between the floor and the stone, but the exemplary embodiment is not limited thereto.

When a predetermined event has occurred, the processor 190 may display an AR item based on the configuration information of the object. When the predetermined event has occurred or an AR-based item is displayed on the display 141, the processor 190 may output a predetermined sound through the speaker 143 and output the vibration of a specific pattern through the vibrator 145.

Hereinafter, the driving of the information providing apparatus 100 according to various exemplary embodiments will be described schematically with reference to FIGS. 4 to 11.

FIG. 4 is a diagram for describing driving of the information providing apparatus 100 for displaying a location of an object to which an AR item is mapped based on a geofence according to an exemplary embodiment of the present disclosure.

Here, indoor geofence (IGFC) is an area that distinguishes indoor and outdoor areas, and the outside area of the IGFC is a section that may receive GPS information, and the inner area of the IGFC is a section which may not receive GPS information. Accordingly, the information providing apparatus 100 may recognize an object to which an indoor AR item is mapped using various measurement techniques (photographing by the camera 121, detection of a short range communication range, sound recognition, movement displacement calculation through various sensing units 130 of the information providing apparatus 100, etc.).

Referring to FIG. 4, objects OB4a to OB4c and OB5a to OB5c may be displayed in the order of distance with the information providing apparatus 100 at a center "A" (100A). The information providing apparatus 100 searches for the objects OB4a to OB4c and Ob5a to OB5c to which the displayed AR items are mapped, and then may guide the user USER to move to the objects OB4a to OB4c and Ob5a to OB5c based on information on east, west, south, and north directions.

FIG. 5 is a diagram for describing driving of the information providing apparatus 100 including a storage space and recognizing an object mapped to an AR item according to an exemplary embodiment of the present disclosure.

Referring to FIG. 5, the user USER may enter into a trigger space TAR from the outside of the trigger space TAR (USER (1)). When there is an object OB6a mapped to the AR item in the entered trigger space TAR, the information providing apparatus 100 may display the object OB6a on the display 141 as a photographing object OB6b. As an optional exemplary embodiment, the information providing apparatus 100 may be implemented as an HMD to be worn by a user USER. The object OB6a may be a box including a storage space therein and may include an opening/closing portion (e.g., a cover) to open and close the storage space.

In this case, the processor 190 may determine that an event for displaying AR items ARI2 to ARI4 has occurred according to a predetermined situation. First, the processor 190 may display first AR items ARI2 and ARI3 corresponding to the exposed area of the object in the photographed image. The first AR items ARI2 and ARI3 may include a text ("If you open the box, something good will happen") and an image that guide the user to open the object OB6a directly, and may be items that guide (through a touch input and the like) the closing/opening portion (cover) of the photographed object OB6b to be opened only on the display 141.

Here, the processor 190 may display various image effects (e.g., a vibration effect) for the specific AR item ARI2 on the display 141.

According to the exemplary embodiment, the processor 190 may display at least one of notification information regarding AR items ARI2 and ARI3 for inducing opening of the storage space included in the object OB6a, information about articles disposed in the storage space, information about the AR item ARI4 disposed in the storage space, or information about the object OB6a in an adjacent area of the photographing object OB6b.

The processor 190 may display the AR item ARI4 disposed in the storage space when the user USER moves to a second point USER (2) to open the opening/closing portion and focuses the object OB6a through the camera 121. In this case, the AR item ARI4 may be displayed while having an effect such as floating.

FIGS. 6 to 8 illustrate driving of the information providing apparatus 100 according to various exemplary embodiments of the present disclosure. In FIGS. 6 to 8, the information providing apparatus 100 commonly displays a first AR item exposed when first entering the trigger space TAR and a second AR item exposed when a predetermined condition is achieved.

Referring to FIG. 6, when the processor 190 photographs an object OB7 having a storage space in the trigger space TAR, the processor 190 may display the first AR item ARI5 guiding the user to issue a user voice command of "Fish, come out".

If the information providing apparatus 100 receives a user's voice and compares the user's voice with the pre-stored sound, and determines that the corresponding sound is input, the information providing apparatus 100 may display a second AR item ARI6a displaying water that fills the interior of the storage space of the object by a predetermined amount and display a swimming body that swims in the water as a third AR item ARI6b.

Referring to FIG. 7, when the processor 190 photographs an object OB8 including a non-exposed area (an area between the bottom surface and the object) in the trigger space TAR, the processor 190 may display an AR item ARI7 of "Lift this stone". The AR item ARI7 is a phrase for exposing a non-exposed area of the object OB8 and may include an image.

The processor 190 may display the AR item ARI8 in the non-exposed area of the object OB8 when a user's hand USER(H) near a predetermined distance from the object OB8 lifts the object OB8.

Referring to FIG. 8, when photographing a predetermined object OB9 (a book) in the trigger space TAR, the processor 190 may highlight an edge of the object OB9 to display an AR item ARI9a. When the object OB9 is unfolded, the processor 190 may display an AR item ARI9b disposed in the non-exposed area of the object OB9. Accordingly, a user-friendly user interface may be provided.

FIG. 9 is a diagram for describing driving of an information providing apparatus that automatically displays AR items when being close to an object according to an exemplary embodiment of the present disclosure. The information providing apparatus may display AR items including user's memo information by considering a user's life pattern. Here, an object OB10 may be implemented in the same line as a clothesline, but the exemplary embodiment is not limited thereto.

Referring to FIG. 9, when the object OB10 is photographed at a predetermined distance, the information providing apparatus 100 may display user's memo information (time information, photo information, etc.) in sequential order (left→right) in time order.

The information providing apparatus 100 may display an AR item ARI10 indicating a picture at the oldest first viewpoint and a clip for fixing the picture, display an AR item ARI11 indicating a picture at a second viewpoint and a clip for fixing the picture, and finally display an AR item ARI12 indicating a picture at a third viewpoint and a clip for fixing the picture in sequence. In particular, the information providing apparatus 100 may display corresponding AR items ARI10 to ARI12 on an already existing object according to a movement order of the user.

The information providing apparatus 100 may variously display an AR item including user's memo information based on the life pattern of the user in consideration of time information, moving route information, location information, use frequency information, etc.

FIGS. 10 and 11 illustrate driving of the information providing apparatus 100 according to various exemplary embodiments of the present disclosure. In FIGS. 10 and 11, the information providing apparatus 100 commonly displays a first AR item exposed when first entering the trigger space TAR and a second AR item exposed when a predetermined condition is achieved.

Referring to FIG. 10, when the processor 190 photographs an object OB11 having a storage space BB in the trigger space TAR, the processor 190 may display a first AR item ARI13. The first AR item ARI13 corresponds to an AR item for inducing a user USER to open a drawer.

When the user USER opens the drawer, the processor 190 may display information on the object to be filled based on the information on the object OB12 disposed therein through a second AR item ARI14. That is, the processor 190 may determine the number of objects to be filled by the user USER and notify the determined number of objects to the user USER. For example, the processor 190 may count socks when there are 12 pairs of socks in the drawer and 6 pairs are used and provide the user with a suggestion phrase such as "six pairs of socks should be filled" as needed.

This management of the increase or decrease of quantity may be usefully applied to an important field (inventory management, logistics management, etc.) after all objects in the space are identified in advance.

Referring to FIG. 11, when photographing an object OB13 in the trigger space TAR, the processor 190 may display AR items ARI15a and ARI16a. When the user USER is disposed at a far distance from the object OB13, the AR items ARI15a and ARI16a may provide a predetermined sound by the set output or increase the output intensity of the sound as being closer to the object OB13. Accordingly, the processor 190 may increase the output and size to provide the AR items ARI15b and ARI16b.

FIG. 12 is a sequence diagram illustrating a method for providing information based on object recognition according to an exemplary embodiment of the present disclosure.

The information providing apparatus 100 recognizes an object disposed within the photographing range of the camera 121 (S710, "object recognition step").

Next, the information providing apparatus 100 waits for occurrence of a predetermined event for outputting one or more AR items corresponding to the recognized object (S720, "event occurrence detection step").

Finally, when the predetermined event has occurred, the information providing apparatus 100 may display the AR item based on the exposed area of the object exposed to the photographing range and the non-exposed area of the object not exposed to the photographing range (S730, "AR item displaying step").

Here, the event occurrence detection step S720 may include various detection steps for outputting an AR item, for example, one of an entry detection step of the information providing apparatus 100 in short range communication coverage of an object, an entry detection step of the information providing apparatus 100 in mobile communication coverage of a predetermined range to which the object belongs, an input detection step of a predetermined sound sequence, and a detection step of a marker adjacent to the object at a predetermined distance. However, the detection step is not limited to the above-described exemplary embodiment.

The AR item displaying step S730 may include displaying a first AR item in an exposed area of the object when a predetermined event has occurred.

The displaying of the first AR item may include displaying a phrase or an image for inducing a user's motion to expose the non-exposed area of the object. The displaying of the first AR item may include displaying in a predetermined area a second AR item including at least one of information about the first AR item, information on an article disposed in the non-exposed area of the object, information about the AR item disposed in the non-exposed area of the object, or information about the object.

In addition, in the information providing method, a predetermined sound may be output, or a predetermined pattern of vibration may be output when the predetermined event has occurred, or the AR item is displayed.

Further, in the information providing method, when the storage space is disposed in the object, a first AR item for opening the storage space of the object may be displayed when the predetermined event has occurred.

Here, when the information providing apparatus 100 displays the first AR item, the information providing apparatus 100 may display in an adjacent area of the first AR item a second AR item including at least one of information about the first AR item, information on an article disposed in the storage space, information about the AR item disposed in the storage space, or information about the object.

The information providing method may further include disposing an AR item included in the AR item in the non-exposed area of the object before step S730 and displaying an AR item including a phrase or an image for exposing the AR item disposed in the non-exposed area when the information providing apparatus approaches the object at a predetermined distance.

The information providing method may further include outputting a predetermined sound when the information providing apparatus approaches the object at a predetermined distance and increasing the output intensity of the sound as the distance from the object is closer.

Meanwhile, according to an exemplary embodiment of the present disclosure, the mapping apparatus 200 for mapping one or more AR items activated under a predetermined condition to an object may include an input unit including a camera, a storage unit, and a processor. The processor may recognize an object disposed within a photographing range of the camera, store at least one of information about the object, arrangement information of the AR item, and information about the AR item in the storage unit and set event information for activating the AR item.

The mapping apparatus may be implemented with the same devices as the information providing apparatus 100.

The processor of the mapping apparatus may dispose the AR item in the non-exposed area or the exposed area of the object based on configuration information including at least one of shape information, form information, and arrangement information of the recognized object.

The AR item disposed in the mapping apparatus may be displayed after the information providing apparatus 100 recognizes the object.

The present disclosure described above can be embodied as computer readable codes on a medium in which a program is recorded. The computer readable recording medium includes all kinds of recording devices storing data which may be deciphered by a computer system. Examples of the computer-readable recording medium may include hard disk drives (HDDs), solid state disks (SSDs), silicon disk drives (SDDs), ROMs, RAMs, CD-ROMs, magnetic tapes, floppy disks, optical data storage devices, and the like. In addition, the computer may include the processor 190 of the information providing apparatus 100.

Although specific embodiments of the present disclosure have been shown and described above, the present disclosure is not limited to the specific embodiments described, and those skilled in the art will appreciate that various modification and changes may be made therein, without departing from the scope and spirit of the present disclosure. Therefore, the scope of the present disclosure should be defined not by the above-described embodiments but by the technical idea defined in the following claims.

What is claimed is:

1. An information providing apparatus based on object recognition, the information providing apparatus comprising:
   a camera;
   a display; and
   a processor configured to recognize an object disposed in a photographing range of the camera,
   wherein the processor causes the display to:
   display a first augmented reality (AR) item in an exposed area of the object based on the exposed area of the object being exposed in the photographing range and a non-exposed area of the object not being exposed in the photographing range in response to a determination that a predetermined event for outputting at least one AR item corresponding to the recognized object has occurred, wherein the first AR item comprises memo information of a user based on at least one of time information, moving route information, location information, or use frequency information based on a life pattern of the user,
   display a second AR item in a predetermined area, wherein the second AR item comprises information about an article disposed in the non-exposed area or information about the second AR item disposed in the non-exposed area, and
   display location information of at least one object being mapped to the at least one AR item before recognizing the object disposed within the photographing range of the camera.

2. The information providing apparatus of claim 1, wherein the first AR item comprises a phrase or an image for inducing a motion of a user for exposing the non-exposed area of the object.

3. The information providing apparatus of claim 1, wherein the second AR item in the predetermined area further comprises information about the first AR item, or information about the object.

4. The information providing apparatus of claim 1, wherein the object comprises a storage space and an opening/closing portion for opening and closing the storage space, and wherein the first AR item comprises a message for inducing opening of the storage space in response to the determination that the predetermined event has occurred.

5. The information providing apparatus of claim 4, wherein the processor causes the display to display a third AR item within the photographing range of the camera in response to opening the storage space.

6. The information providing apparatus of claim 1, wherein the object comprises a storage space, and wherein the first AR item indicates a predetermined amount of water to be filled in the storage space and wherein the second AR item indicates a swimming body in the first AR item.

7. The information providing apparatus of claim 1, further comprising:
   a communicator having a short-range communication module and a mobile communication module,
   wherein the processor determines that the predetermined event has occurred in response to the information providing apparatus entering short-range communication coverage of the object through the short-range communication module or entering within a predetermined range of mobile communication coverage to which the object belongs through the mobile communication module.

8. The information providing apparatus of claim 1, further comprising a microphone,
   wherein the processor determines that the predetermined event has occurred in response to a predetermined sound sequence being input through the microphone.

9. The information providing apparatus of claim 1, wherein the processor determines that the predetermined event has occurred in response to a marker located within a predetermined distance from the object being recognized.

10. The information providing apparatus of claim 1, further comprising a speaker or a vibrator, wherein the processor causes the speaker to output a predetermined sound or causes the vibrator to output a predetermined pattern of vibration in response to the determination that an occurrence of the predetermined event has occurred or the first AR item being displayed on the display.

11. The information providing apparatus of claim 1, further comprising a speaker,
    wherein the processor:
    causes an output of a predetermined sound through the speaker when the information providing apparatus approaches the object within a predetermined distance; and
    increases an output intensity of the predetermined sound as a distance from the object becomes closer.

12. An information providing method based on object recognition, the information providing method comprising:
    displaying, by a device, location information of at least one object being mapped to at least one augmented reality (AR) item before recognizing, by the device, an object disposed within a photographing range of a camera;
    determining, by the device, occurrence of a predetermined event for outputting one or more AR items corresponding to the recognized object;
    displaying, by the device, a first AR item in an exposed area of the recognized object based on the exposed area of the recognized object being exposed to the photographing range and a non-exposed area of the recognized object not being exposed to the photographing range in response to a determination that the predetermined event has occurred, wherein the first AR item comprises memo information of a user based on at least one of time information, moving route information, location information, or use frequency information based on a life pattern of the user; and
    displaying, by the device, a second AR item in a predetermined area, wherein the second AR item comprises information about an article disposed in the non-exposed area or information about the second AR item disposed in the non-exposed area.

13. The information providing method of claim 12, wherein the determination of the occurrence of the predetermined event is based on at least one of:
- detecting entry of the device into short-range communication coverage;
- detecting entry of the device into mobile communication coverage in a predetermined range to which the object belongs;
- detecting an input of a predetermined sound sequence; or
- detecting a marker adjacent to the object by a predetermined distance.

14. The information providing method of claim 12, wherein the first AR item comprises displaying, by the device, a phrase or an image for inducing the non-exposed area of the object to be exposed.

15. The information providing method of claim 12, wherein the second AR item in the predetermined area comprises information about the first AR item, or information about the object.

* * * * *